United States Patent [19]

Wald

[11] Patent Number: 4,646,961

[45] Date of Patent: Mar. 3, 1987

[54] REUSABLE CLOSURE DEVICE FOR CARTONS FOR GABLE TOPS

[76] Inventor: Hy Wald, 108 Flick Dr., Fort Washington, Pa. 19034

[21] Appl. No.: 800,477

[22] Filed: Nov. 21, 1985

[51] Int. Cl.$^4$ .............................................. B65D 45/04
[52] U.S. Cl. .................................... 229/45 R; D7/70; D9/455; 220/85 H; 229/17 G
[58] Field of Search ............................ 229/17 G, 45 R; 220/85 H, 94 A; 24/30.5 R, 30.5 L; 222/183; 294/27.1; D9/455; D7/70

[56] References Cited

U.S. PATENT DOCUMENTS

| | | | |
|---|---|---|---|
| D. 182,215 | 2/1958 | Wilson | D7/70 |
| 2,030,134 | 2/1936 | Burgener | 229/43 |
| 2,896,812 | 7/1959 | Paprocki | 220/85 H |
| 2,906,439 | 9/1959 | Santuci, Sr. | 222/183 |
| 3,217,967 | 11/1965 | Jackson | 229/17 G |
| 3,373,897 | 3/1968 | Haines | 220/85 H |
| 3,381,883 | 5/1968 | Harris | 229/47 |
| 3,458,110 | 7/1969 | Goldman | 229/17 G |
| 3,463,380 | 8/1969 | Cooperstein | 229/17 G |
| 3,488,078 | 1/1970 | Cooperstein | D7/70 |
| 3,693,864 | 9/1972 | Wilkins | 229/17 G |

FOREIGN PATENT DOCUMENTS 81458 3/1952 Norway .......................... 229/52 A Primary Examiner—William Price
Assistant Examiner—Gary E. Elkins
Attorney, Agent, or Firm—Caesar, Rivise, Bernstein, Cohen & Pokotilow, Ltd.

[57] ABSTRACT

A device for protecting the contents of cartons with gable tops from odor, dust, dirt or other contaminants and from spillage after the carton is opened, is disclosed. The device is placed upon the carton and covers the top part of the carton. A longitudinal gap in the device encloses and presses together the top strips of the carton, which were pried apart to form a spout for dispensing the contents of the carton, thereby closing the carton.

For larger cartons, the device incorporates a section for holding the carton with a handle for tilting the carton to dispense its contents. In one embodiment, the closure section of the device snaps onto the holding section to close the carton. In a second embodiment, the closure section is connected to the holding section by a hinge.

4 Claims, 6 Drawing Figures

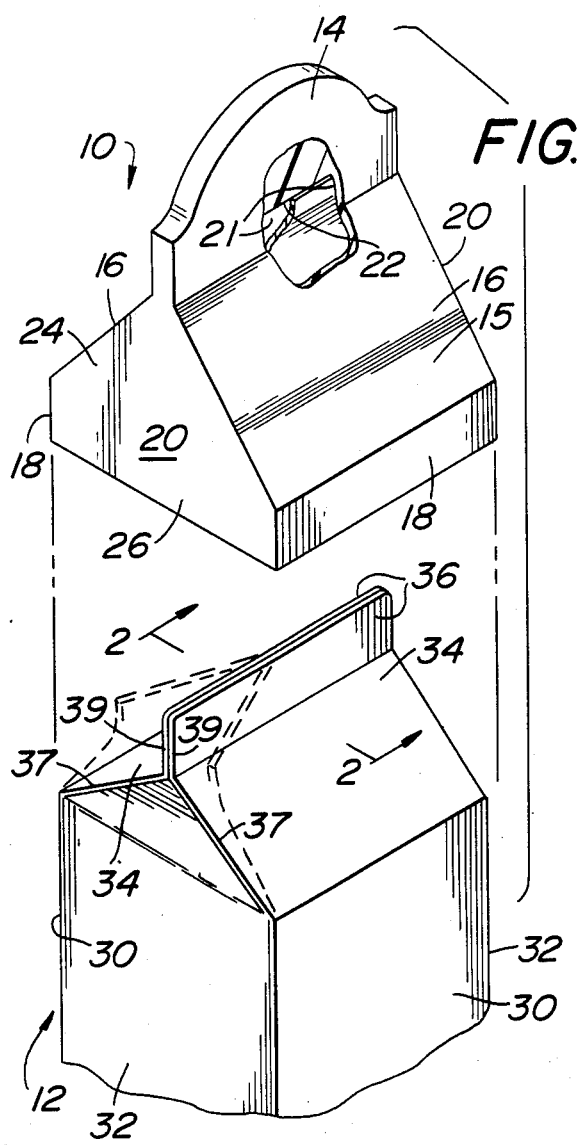
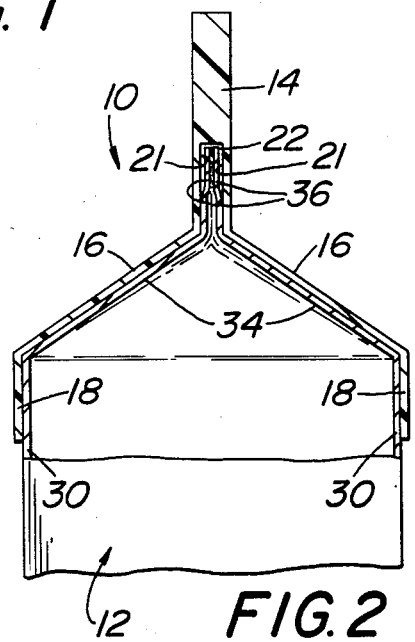
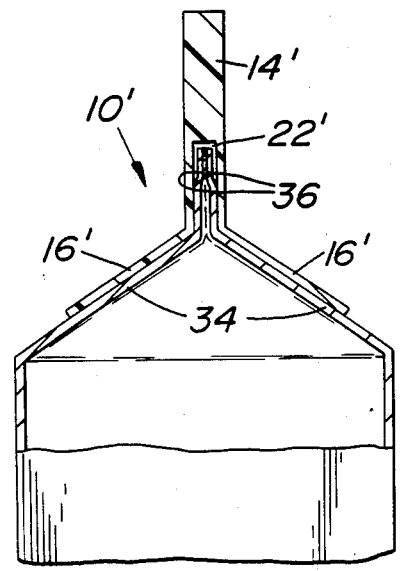

REUSABLE CLOSURE DEVICE FOR CARTONS FOR GABLE TOPS

BACKGROUND OF THE INVENTION

This invention relates generally to an inexpensive device which may be applied to standard cartons to reclose the cartons after they have initially been opened, so that the contents are protected against odor, dust, dirt, or other contaminants, and against spillage of the contents.

In recent years, the packaging materials for milk, fruit juices, and many other materials have changed from glass or plastic containers to heavy paper or cardboard cartons, particularly for half gallon sizes or less. These cartons have gable tops, are often wax impregnated or wax coated, and multi-layered strips at the top of the carton which are heat sealed together to close the carton. By prying apart the strips at one side of the carton, a pouring spout is formed to enable easy dispensing of the contents of the carton.

After the dispensing of the desired amount of contents, the spout may then be folded back inward. However, the closure is now imperfect since the heat seal on the pried portion of the strip has been broken and the various layers of the strip are no longer in close contact with each other. Thus the contents of the carton are subject to contamination by moisture, odors, dust, dirt and the like. Further the contents of the carton are subject to spillage.

This invention provides an inexpensive, easily applied, means for closing and protecting the contents of cartons after they have been initially opened. A flanged cap is placed over the strips at the top of the carton, which have been pried apart to allow for dispensing of the contents of the carton. The interior surfaces of the cap, defining a longitudinal slot, press the layers of the strips together to close the carton and protect its contents. It can be applied to any standard carton of the type described above and is easily removed when the user wishes to dispense part of the contents of the carton and when the carton is empty and ready for disposal by the user. Thus one or two of these devices may serve a household, and may be used and reused ad infinitum.

Further, the device may be dimensioned to fit any standard size carton, i.e., one pint, one quart, one-half gallon, etc. For larger cartons, such as one-half gallon sizes, holders are often used to supply a handle for ease of dispensing of the contents. The invention may also comprise such a holder for the carton, with a top portion for supplying the closure either as a separate element which snaps on to the holder, or as an element hinged to the holder which can be opened or closed to supply the closure.

Previous devices for the closure of gable types of cartons have been incorporated in the carton design and have been manufactured and supplied with the carton. Blunsdon, U.S. Pat. No. 3,680,771 shows a closure device wherein the container includes a flap which folds over one of the top strips of the container with a spring clip inserted over the flap to provide the closure.

Ringler, U.S. Pat. No. 2,336,503 teaches a gable or bellows container sliding closure comprised of a slotted closure member which slides over the top strip of the container. Again in this case the containers are specifically designed to incorporate the closure mechanism, and the closure element is supplied with the container when the container is manufactured.

A closure device for a flat top box is shown by Burgener, U.S. Pat. No. 2,030,134. It is employed where the contents are removed from the box by punching holes or perforations in the top of the box.

None of the above devices or others previously designed allow for a continuously reusable closure for cartons with gable tops. The instant device may be used with all standard types of containers and does not require any special container designs. Previous designs do not obtain closure by enclosing the strips at the top of the carton, which were previously pried apart, within a longitudinal slot in a cap placed on the carton. Further, previously designed closure devices do not incorporate a section for holding and ease of handling larger cartons.

OBJECTS OF THE INVENTION

Accordingly, it is the general object of the invention to provide a closure device for cartons with gable tops which protects the contents of the carton from contamination or spillage after the carton has been opened, and which overcomes the disadvantages of the prior art.

It is another object of the invention to provide a closure device for standard sized, comercially available, cartons with gable tops;

It is a further object of the invention to provide a closure device for cartons with gable tops which is easily applied and removed from the cartons.

It is yet a further object of this invention to provide a closure device for cartons with gable tops which is reusable and may be further applied to cartons, after the carton in use has been disposed of, for an extended period of time.

It is still yet a further object of this invention to provide a closure device for cartons with gable tops which incorporates a holder for the carton with a handle to enable ease of handling and dispensing of the contents of the carton.

SUMMARY OF THE INVENTION

The invention comprises a flanged cap in which a longitudinal slot has been formed. Two inclined side walls which extend downward and outward from the bottom of the cap may be added. When the device is placed on the carton, the strips at the top of the carton, which have been pried open to allow for access of the contents of the carton, are enclosed within the slot, so that the multiple layers of the strips are pressed together to provided a closure for the carton. The inclined walls, if added, abut and rest upon inclined panels of the carton.

The inclined walls may extend to the end of the inclined panels of the carton and a short vertical skirt may be added to each inclined wall. Further, the device may also include front and rear walls so that the top of the carton is completely enclosed.

For large cartons, a holding section with a handle is added for ease of handling and for ease of dispensing of the contents of the carton. A top closure element may be snapped on to the upper portion of the carton. In an alternative embodiment, the closure section is hingedly secured to a holding section. By rotating the closure element about the hinge, it may be closed, providing closure to the carton, or opened for dispensing the contents of the carton or for disposal of the carton itself.

DESCRIPTION OF THE DRAWINGS

Other objects and many of the attendant advantages of this invention will be readily appreciated when the same becomes better understood by reference to the following detailed description when considered in connection with the accompanying drawing wherein:

FIG. 1 is an exploded isometric view of a closure device and a standard carton with a gable top;

FIG. 2 is an enlarged sectional view taken along line 2—2 of FIG. 1 of the closure device when placed upon the carton;

FIG. 3 is a sectional view of an alternative embodiment of the closure device shown in FIG. 1 wherein the device does not completely enclose the top portion of the carton;

DETAILED DESCRIPTION OF THE PREFERRED EMBODIMENT

Figure 6:
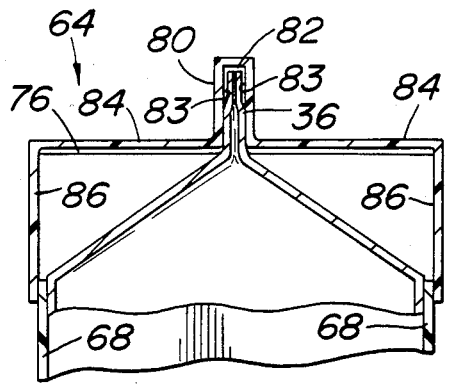
FIG. 6 is a sectional view taken along line 6—6 of FIG. 5.

Referring now in greater detail to the various figures of the drawing wherein like reference characters refer to like parts, there is shown in FIG. 1 a closure device 10 for use with a conventional carton having a gable top arranged to be peeled open to form a pouring spout. The device 10 is arranged for disposition over the gable top to hold it closed, after it has been opened, thereby preventing the ingress of contaminants, odors or air therein, while also precluding any accidental spillage therefrom.

The device 10 basically comprises a flanged cap 14 and a peripherally extending lip member 15 comprising a pair of inclined side walls 16, a pair of skirts 18 depending therefrom and a front and a rear wall 20. The flanged cap 14 has interior surfaces 21 which define a longitudinal slot 22.

The side walls 16 extend downward and outward from the cap 14 to form an inverted vee, as shown. Each of the front and rear walls 20 is oriented vertically and comprises an upper triangular portion 24 and a lower rectangular portion 26. Each of the skirts 18 is also vertically oriented, with the edges of the skirts 18 being co-planar with the bottom edge of the lower portions 26.

The carton 12 is a standard carton which is in prevalent use for holding milk, fruit juices, and other type materials. Thus, carton 12 comprises a base (not shown), a pair of side panels 30, a front and a back panel 32, a pair of inclined panels 34 which terminate at their upper end in a pair of strips 36.

At the time of manufacture, after carton 12 has been filled with its contents, the strips 36 are sealed together longitudinally along their length to close the carton. Usually a heat sealing technique is used.

As in conventional cartons, in order to gain access to the contents of the carton, the consumer grasps the front edges 37 of the inclined panels 34 to pry apart the front end 39 of strips 36 to separate them as shown by the phantom lines in FIG. 1. The strips 36 are double layered, so that a spout (not shown) may be formed by pulling back (outward) the inside layer of each of the strips 36. The contents of the carton 12 may then be dispensed via the spout. After use, the inner layers of strips 36 are pushed back so they are again parallel with the outer layers of strips 36. However, since the seal has been broken, a gap exists, whereby moisture, odors, dust, dirt and the like can contaminate the contents of the carton 12. Further if carton 12 is inadvertently tipped over, its contents may be spilled. When the closure device 10 is placed over a carton which has been opened, it will close the carton and protect the contents of the carton against contamination and spillage, as described below.

Referring now to FIG. 2, it is seen that when closure device 10 is placed upon carton 12, the vertical strips 36 of the carton's top are enclosed by and held together by the interior surfaces 21 of the slot 22 in the device. Moreover, the inclined walls 16 of device 10 abut and rest upon the inclined panels 34 of carton 12, while the skirts 18 abut the side panels 30. Thus, it is seen that closure device 10 fits snuggly upon the top of the carton 12, and closes carton 12 by pressing vertical strips 36 together thereby protecting the contents of carton 12 from contamination and spillage.

Each time access to the contents of carton 12 is desired, the device is easily removed from the top of carton 12 to permit such access by grasping its flanged cap 14 and pulling the device away from carton 12. When all of the contents of carton 12 have been removed, and carton 12 is disposed of, the closure device 10 is available for use on other cartons of the same size. Thus, the flanged cap 14 also provides a gripping area for installing closure device 10 on carton 12. It is shown with a rounded top for decorative purposes. Alternatively cap 14 can be made rectangular with a straight top.

Device 10 may be sold to the general public for use by consumers to protect the contents of gable top cartons they may possess. Another possible method of distribution and sale of closure device 10 would be as a "give-away" for advertising purposes and promotions. Thus, the surfaces of cap 14 may contain printed advertising indicia thereon.

FIG. 3 which is a sectional view of an alternative embodiment of the closure device which has been placed upon carton 12. Device 10' comprises flange cap 14', longitudinal slot 22' in flanged cap 14', and inclined side walls 16'. Vertical strips 36 of carton 12 are enclosed within gap 22' so that strips 36 are pressed together closing the carton. Inclined side walls 16' do not extend to the full length of rectangular panels 34 as in device 10. Thus closure device 10' offers a less expensive method for providing a closure for carton 12 without fully covering and protecting the entire top of carton 12.

An even simpler closure device comprises the flanged cap 14 only, with a longitudinal slot for holding the vertical strips closed and without inclined side walls.

In accordance with preferred embodiments of this invention the closure devices which have just been described are formed of a low cost, yet strong and rugged material, such as a plastic.

Figure 4:
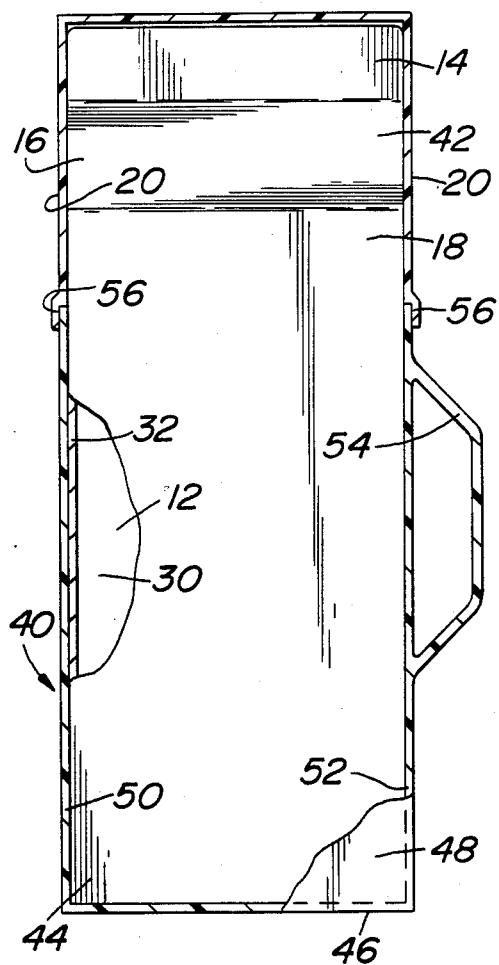
FIG. 4 is a side elevational view, in section, of the closure device which incorporates a holder for the carton.

As is known standard cartons with gable tops for milk, juices, and other foods, as well as other materials are usually made in half pint, pint, quart and half gallon sizes. The cartons are made of reinforced paper or cardboard, and are usually impregnated with wax. However, larger cartons are difficult to handle due to their relatively large size. In particular it is difficult to hold a large carton while dispensing its contents. Therefore, in accordance with another aspect of this invention holders are provided having handles to facilitate the handling of the cartons. In FIG. 4 there is shown a device constructed in accordance with this invention which holds the carton to provide a handle for ease in tilting the carton when dispensing its contents, as well as a closure to protect the contents of the carton from contamination and spillage after the carton has been opened.

As can be seen in FIG. 4 the device 40 comprises a hollow upper section 42 and a hollow lower section 44. The lower section 44 comprises a bottom wall 46, a pair of side walls 48, a front wall 50 and a rear wall 52. With upper section 42 removed, the carton 12 may be placed within the interior of lower section 44. A handle 54 is attached to the rear wall 52 to provide the means for holding the device 40 in ones hand.

The upper section 42 is identical in structure to closure device 10 of FIG. 1 except that the top edge of flanged cap 14 is straight rather than rounded, and a circumferential lip 56 is connected to the bottom edges of skirts 18 and the lower portions of front and rear walls 20. Circumferential lip 56 extends beyond the lower section's front wall 50, rear wall 52, and side walls 48. Therefore, when upper section 42 is placed upon lower section 44, the circumferential lip 56 abuts the outer surfaces of front wall 50, rear wall 52 and side walls 48, in a tight, snap fitting engagement.

In accordance with a preferred embodiment of this invention the device 40 is formed of plastic or some other low cost, yet strong and rugged material.

Figure 5:
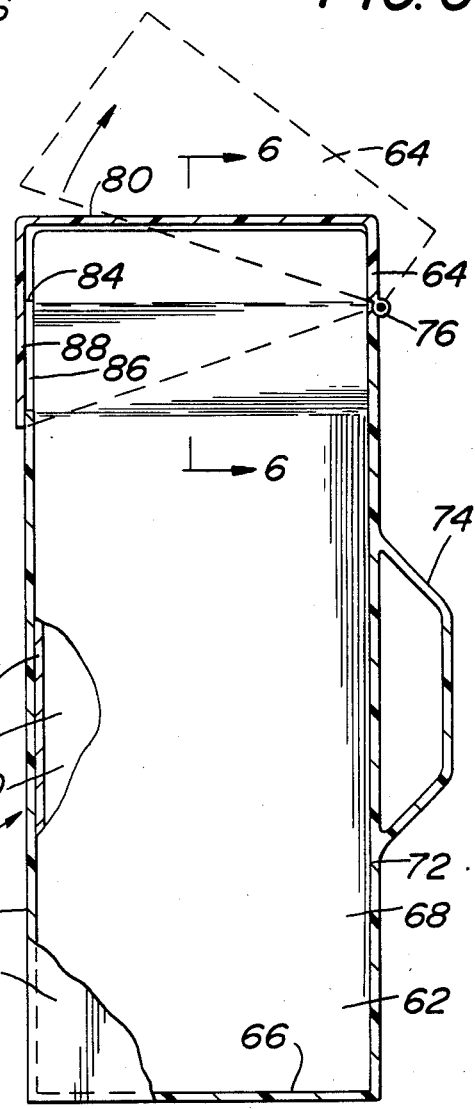
FIG. 5 is a side elevational view, in section, of another embodiment of the closure device with a holder, wherein the closure device is hinged to the holder.

Another embodiment of the closure device which includes a holding element for the carton is shown in FIG. 5. In this embodiment, the device 60 is comprised of a holding section 62 and a closure section 64, the latter of which is connected to and hinged to holding section 62.

Holding section 62 includes bottom wall 66, a pair of side walls 68, a front wall 70, a rear wall 72, a handle 74 which is connected to the rear wall 72, and a hinge 76.

The closure section 64 is connected to and pivots about the hinge 76 to open and close the device 60. The device 60 is shown in a closed position in FIG. 5. To open the device 60, the closure section 64 is pivoted in the direction of the arrow shown to the open position shown by the phantom lines in FIG. 5.

A sectional view of the closure section 64, taken along lines 6—6 of FIG. 5, with closure section 64 in its closed position, is shown in FIG. 6. Thus, as can be seen the closure section 64 comprises a flanged cap 80, a longitudinal slot 82 within the flange cap which is defined by interior surfaces 83 thereof, a pair of shoulders 84, and a pair of side walls 86. The side walls 86 and the front wall 88 of closure section 64 (FIG. 5) slightly overlap side walls 68 and front wall 70 of the holding section 62 to preferably form a tight snap fit engagement therebetween.

When closure section 54 is rotated to its closed position, the inner surfaces 83 of flanged cap 80 defining the slot 82 enclose and press the carton's strips 36 together, thereby closing carton 12 and preventing spillage or contamination of the contents of carton 12 in a manner as described heretofore.

After the contents of carton 12 have been emptied, the carton may be disposed of and a new carton placed into device 60, which may be reused repeatedly.

Like the other devices described heretofore, the device 60 is preferably formed of a low cost, yet strong and rugged material such as plastic.

Without further elaboration the foregoing will so fully illustrate the invention that others may, by applying current or future knowledge, readily adapt the same for use under various conditions of service.

What is claimed is:

1. A closure device for a carton with a gable top, said device comprising: a flanged cap including a pair of inner surfaces defining a longitudinal slot, said device further including inclined side walls extending from said flanged cap and adapted to make a snug fit with said gable top, said device further including front and rear walls extending downwardly from said flanged cap, said front and rear walls extending between said side walls, said carton comprising: a pair of strips, said strips having inner and outer surfaces, the inner surfaces of said strips being sealed together along their longitudinal length, so that when one end of said strips are pried apart, a pouring spout is formed for dispensing contents of said carton, and when said device is placed onto said carton, said outer surfaces of said strips of said carton are disposed within said slot in a confining relationship whereupon said inner surfaces forming said slots hold said strips closed together thereby protecting the contents of said carton from spillage or the ingress of contaminants therein, and said side walls and front and rear walls conform to said carton to guide said carton strips into said slot.

2. The device of claim 1 wherein said device is formed of plastic.

3. A device for holding and closing a carton having a gable top, said carton comprising: a base, a pair of side panels; a front and a back panel; a pair of inclined panels, each inclined panel connected to and extending upward and inward from each side panel, said inclined panels forming an inverted vee terminating in a pair of vertical strips, each of said strips being connected to each inclined panel and having an inner and outer surface, the inner surface of said strips being sealed together along their longitudinal length, so that when one end of said strips are pried apart, a pouring spout is formed for dispensing contents of said container, and said device comprising: an upper and a hollow lower section, said lower section comprising a bottom wall; a pair of side walls, a front and a rear wall; and a handle attached to said rear wall, said upper section comprising: a flanged cap including a pair of inner surfaces defining a longitudinal slot, said upper section further including inclined side walls extending from said flanged cap and adapted to make a snug fit with said gable top, said device further including front and rear walls extending downwardly from said flange cap, said front and rear walls extending between said side walls, so that when said carton is placed within said lower section and when said upper section is placed on said carton, said outer surfaces of said strips of said carton are disposed within said slot in a confining relationship and said inner surfaces defining said slot hold said strips closed together thereby protecting the contents of said cartons from spillage and the ingress of contaminants, and said inclined side walls and said front and rear walls of said upper section conform to said carton to guide said carton strips into said slot.

4. The device of claim 3 wherein said device is formed of plastic.

* * * * *